United States Patent
Chen et al.

(10) Patent No.: US 7,265,777 B2
(45) Date of Patent: Sep. 4, 2007

(54) METHOD FOR ABSTRACTING MULTIPLE MOVING OBJECTS

(75) Inventors: Hsiao-Ping Chen, Tao-Yuan Hsien (TW); Chou-Ming Chang, Tai-Nan Hsien (TW)

(73) Assignee: Huper Laboratories Co., Ltd., Taipei (TW)

( * ) Notice: Subject to any disclaimer, the term of this patent is extended or adjusted under 35 U.S.C. 154(b) by 843 days.

(21) Appl. No.: 10/248,811

(22) Filed: Feb. 21, 2003

(65) Prior Publication Data

US 2003/0165193 A1   Sep. 4, 2003

(30) Foreign Application Priority Data

Mar. 1, 2002   (TW) .............................. 91103856 A

(51) Int. Cl.
*H04N 7/18* (2006.01)
(52) U.S. Cl. .................................................. 348/155
(58) Field of Classification Search .......... 348/155; 382/173
See application file for complete search history.

(56) References Cited

U.S. PATENT DOCUMENTS

| | | | |
|---|---|---|---|
| 5,177,608 A * | 1/1993 | Ohki et al. | 348/416.1 |
| 6,819,796 B2 * | 11/2004 | Hong et al. | 382/173 |
| 2006/0034519 A1 * | 2/2006 | Toyama et al. | 382/224 |

* cited by examiner

*Primary Examiner*—Young Lee
*Assistant Examiner*—Jeremy Huber
(74) *Attorney, Agent, or Firm*—Winston Hsu

(57) ABSTRACT

A motion detection method is used to abstract multiple moving objects. The motion detection method uses a first frame and a second frame to locate the moving objects appearing in a fixed scene. The method includes calculating a difference of each pixel between the first frame and the second frame, comparing each difference with a first threshold value for generating a plurality of first contours, comparing each difference with a second threshold value for generating a plurality of second contours, picking any of the second contours which overlapped with the first contours for generating corresponding moving blocks, determining whether the pixels located outside the moving blocks are background pixels, and comparing the parameter of each background pixel located inside the moving blocks with its corresponding background value for determining pixels related to the moving objects.

9 Claims, 20 Drawing Sheets

METHOD FOR ABSTRACTING MULTIPLE MOVING OBJECTS

BACKGROUND OF INVENTION

1. Field of the Invention

The present invention relates to a motion detection method, and more particularly, to a motion detection method for abstracting multiple moving objects and increasing detection accuracy.

2. Description of the Prior Art

Digital video recordings (DVR), which have functions of monitoring, video, playing, far-end control, and so on, are popular applications. The digital video recordings use a frame generator to photograph image frames and then store the image frames into a computer after a compression process. Since image compression technology is being developed rapidly, for example, MPEG4 has successfully been used in the digital video recordings, people can use limited hard disc capacity of computers to store the image frames for several weeks or one year. The digital video recordings are gradually replacing old closed circuit televisions (CCTV). Since the digital video recordings use storage media (such as hard discs) to store the image frames, they do not have problems such as mildew, forgetting to switch to a new video, and difficult management of the videos, as was the case of the closed circuit televisions. Moreover, the image data are digital data, so that the image data can be quickly transmitted to distant places through a network, thereby decreasing the transmission time. People in the distant places can receive the image data fast. In addition, the digital image data can be further processed. For example, the digital video recordings always have a monitor and an alarm, so that the digital video recordings can perform the monitor operation through the digital signal. The digital video recordings determine whether an object is moving according to the computer operation, so as to generate a corresponding warning signal.

A prior art detection method uses a calculating device to compare a plurality of image frames generated by a frame generator so as to determine whether an object is moving inside a scene. The calculating device compares a first image frame with a successive second image frame inside the plurality of image frames so as to determine whether the object is moving inside the scene. In general, when the object is moving, a plurality of pixels inside the image frame generated by the frame generator is changed. Therefore, when comparing the first image frame with the second image frame, the calculating device can use a change of the plurality of pixels inside the first and second image frame to be a judge criterion. That means when the plurality of pixels of the image frame are changed, the calculating device can determine whether something is moving inside the scene according to the first image frame and the second image frame.

Please refer to FIG. 1 and FIG. 2. FIG. 1 is a perspective view of a prior art detecting system 50. FIG. 2 is a block diagram of the prior art detecting system 50. As mentioned above, the detecting system 50 determines whether something is moving inside a scene 52 according to a predetermined detection method. The detecting system 50 comprises a frame generator 20 and a calculating device 30. The frame generator 20 is used to periodically picture the scene 52 according to a predetermined period (30 times per second) to generate a plurality of image frames 22. The calculating device 30 is used to process a first image frame 24 and a second image frame 26 inside the plurality of image frames 22, and compare the first image frame 24 with the second image frame 26 according to the predetermined detecting method so as to determine whether something is moving inside the scene 52. The calculating device 30 compares each pixel of the second image frame 26 with the corresponding pixel of the first image frame 24, and determines whether the second image frame 26 is changed from the first image frame 24 according to a threshold value. The calculating device 30 calculates a difference value between each pixel of the first image frame and the second image frame, and determines whether the difference value is larger than the threshold value. If the difference value of the pixels is larger than the threshold value, that means the moving object is moving inside the scene 52. However, if the threshold value is set too small, mixed signals generated inside the second image frame, 26 or little changes generated when the moving object moves are seen as a portion of the moving object. Therefore, an abstracting range generated by the calculating device 30 is larger than a real size of the moving object. If the threshold value is set too high, small movements generated by the moving object are not detected in the second image frame 26. Therefore, the real size of the moving object is unable to be abstracted by the detecting system 50. The detecting system 50 generates a small moving area of the moving object according to the high threshold value, and an error rate while using the high threshold value is low. Conversely, the detecting system 50 generates a large moving area of the moving object according to the small threshold value. The error rate while using the small threshold value is high. Whether using the high threshold value or the small threshold value, the detecting system 50 also easily generates incorrect detections. Therefore, the prior art detecting system 50 is easily influenced by the single threshold value to generate incorrect detections.

In addition, the moving object can be seen as moving inside a stationary background. However, a portion of the background is sheltered by the moving object. When the moving object is moving, the sheltered background will appear again. Therefore, the sheltered background in the first image frame 24 will appear in the second image frame 26. The sheltered background is considered to be a portion of the moving object or to be another moving object. Actually, the sheltered background does not execute any movement. For example, a passerby is walking along a passageway. The passageway is the fixed background. A vase is put on the passageway. When the passageway is walking on the front of the vase, since the vase is sheltered by the passerby, the vase does not appear on the first image frame 24. When the passerby leaves from in front of the vase, both the vase and the passerby appear on the second image frame 26. Then the second image frame 26 is compared with the first image frame 24. Since the pixels corresponding to the vase and passerby in the second image frame 26 are different from the corresponding pixels in the first image frame 24, both the vase and the passerby are considered to be the moving area. However, the vase is a portion of the background and does not generate any movement. The detecting system 50 performs incorrect detection in considering the vase as the moving area and abstracting the image of the vase. The detecting system 50 is unable to differentiate between the moving object and the background. When a plurality of moving objects move inside the background, the detecting system 50 determines that there are a plurality of moving areas inside an image frame 22. The images corresponding to a part of the moving areas are the moving objects, but images corresponding to other parts of the moving areas are the background. Therefore, the detecting system 50 is unable to abstract the moving objects correctly.

SUMMARY OF INVENTION

It is therefore a primary objective of the claimed invention to provide a motion detection method for abstracting multiple moving objects and increasing the detection accuracy so as to solve the problem of the prior art detection method.

The claimed invention, briefly summarized, discloses a method for abstracting multiple moving objects. The method uses a first frame and a second frame to locate the moving objects appeared in a fixed scene. The method includes calculating a difference of each pixel between the first frame and the second frame, comparing each difference with a first threshold value for generating a plurality of first contours, comparing each difference with a second threshold value for generating a plurality of second contours, picking any of the second contours which overlapped with the first contours for generating corresponding moving blocks, determining whether the pixels located outside the moving blocks are background pixels, and comparing the parameter of each background pixel located inside the moving blocks with its corresponding background value for determining pixels related to the moving objects.

It is an advantage of the claimed invention that the claimed invention motion detection method can avoid the influence of the background so that the claimed invention method can detect the plurality of moving objects accurately.

These and other objectives of the claimed invention will no doubt become obvious to those of ordinary skill in the art after reading the following detailed description of the preferred embodiment which is illustrated in the various figures and drawings.

DETAILED DESCRIPTION

Figure 1:
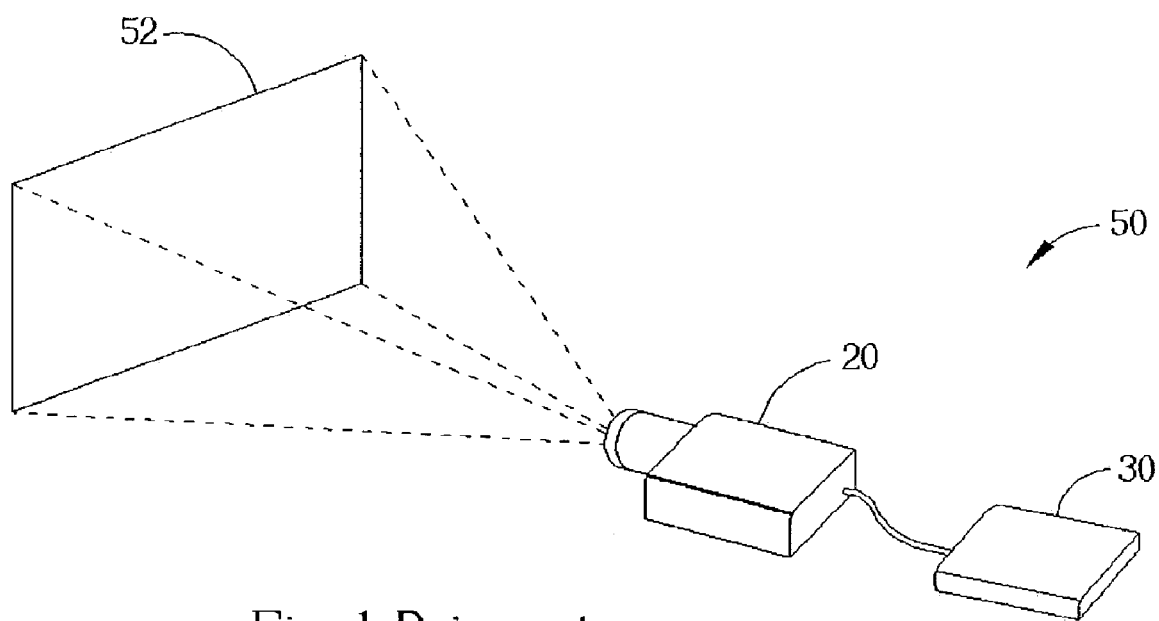
FIG. 1 is a perspective view of a prior art detecting system.
Figure 2:
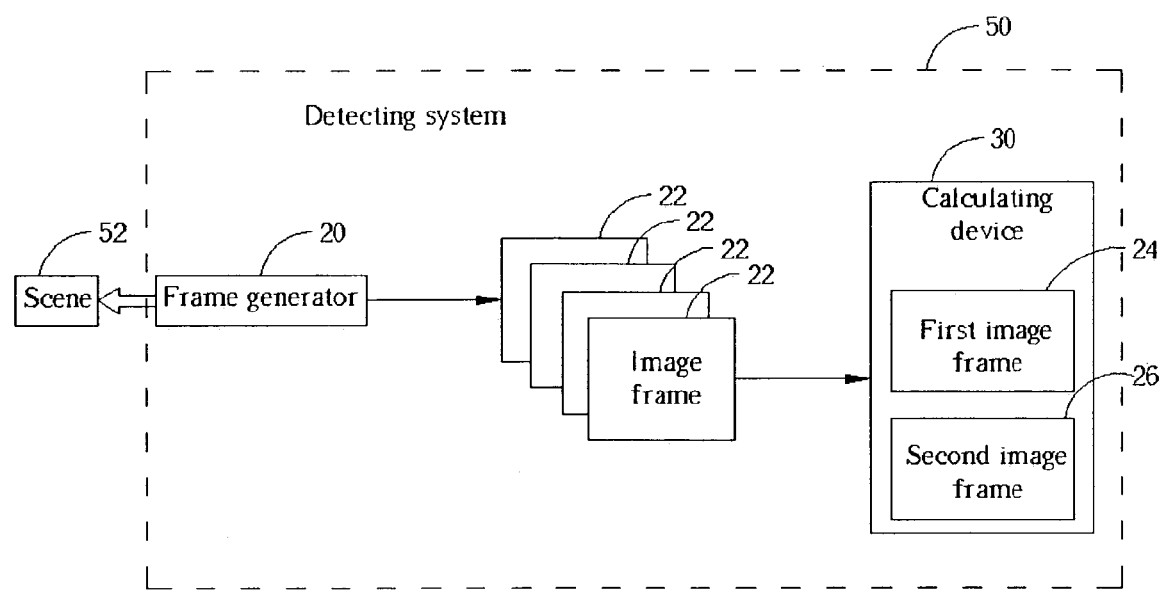
FIG. 2 is a block diagram of the prior art detecting system.
Figure 3A:
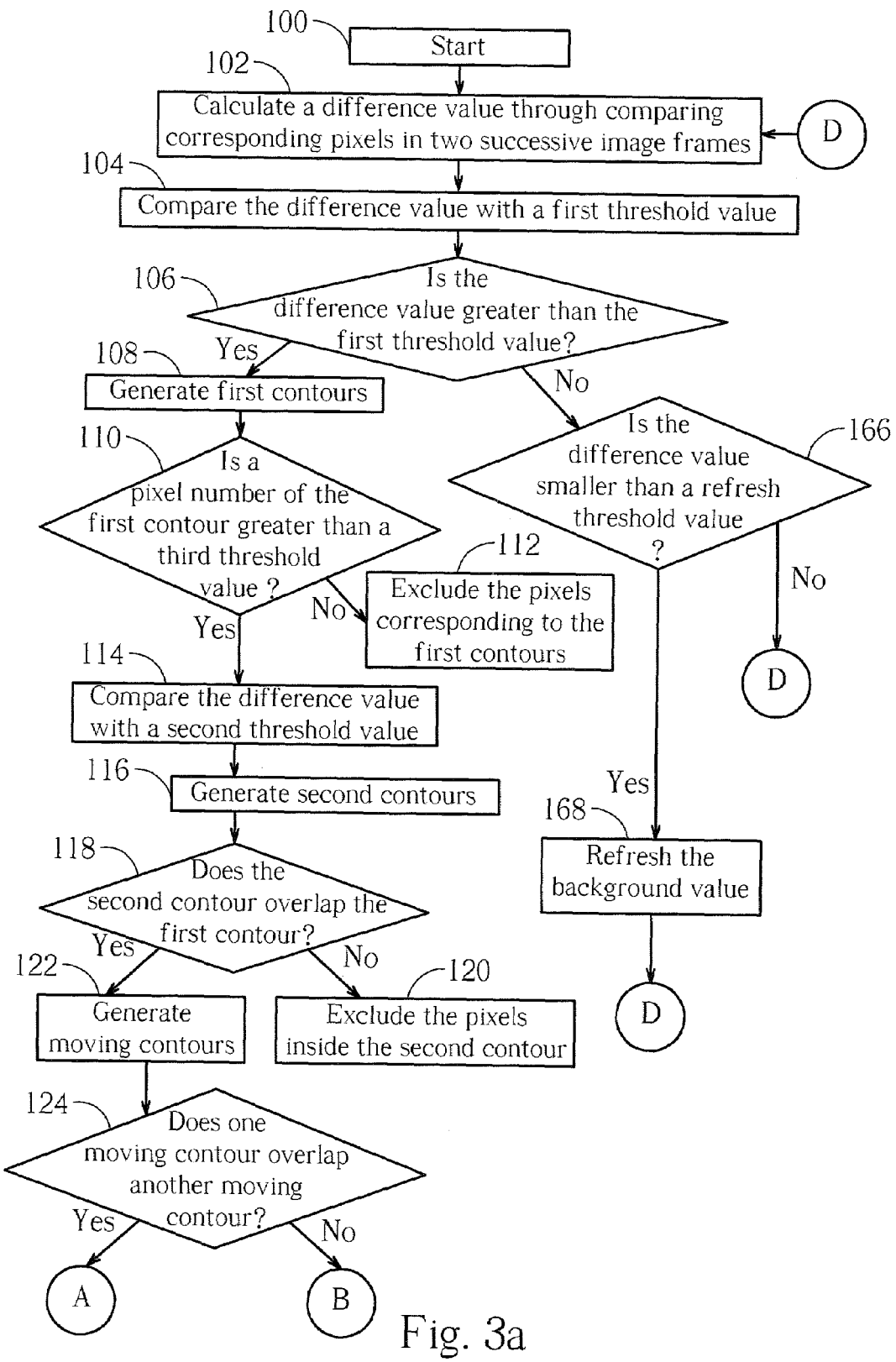
FIGS. 3a to 3d show a flow chart of a present invention motion detection method.
Figure 3B:
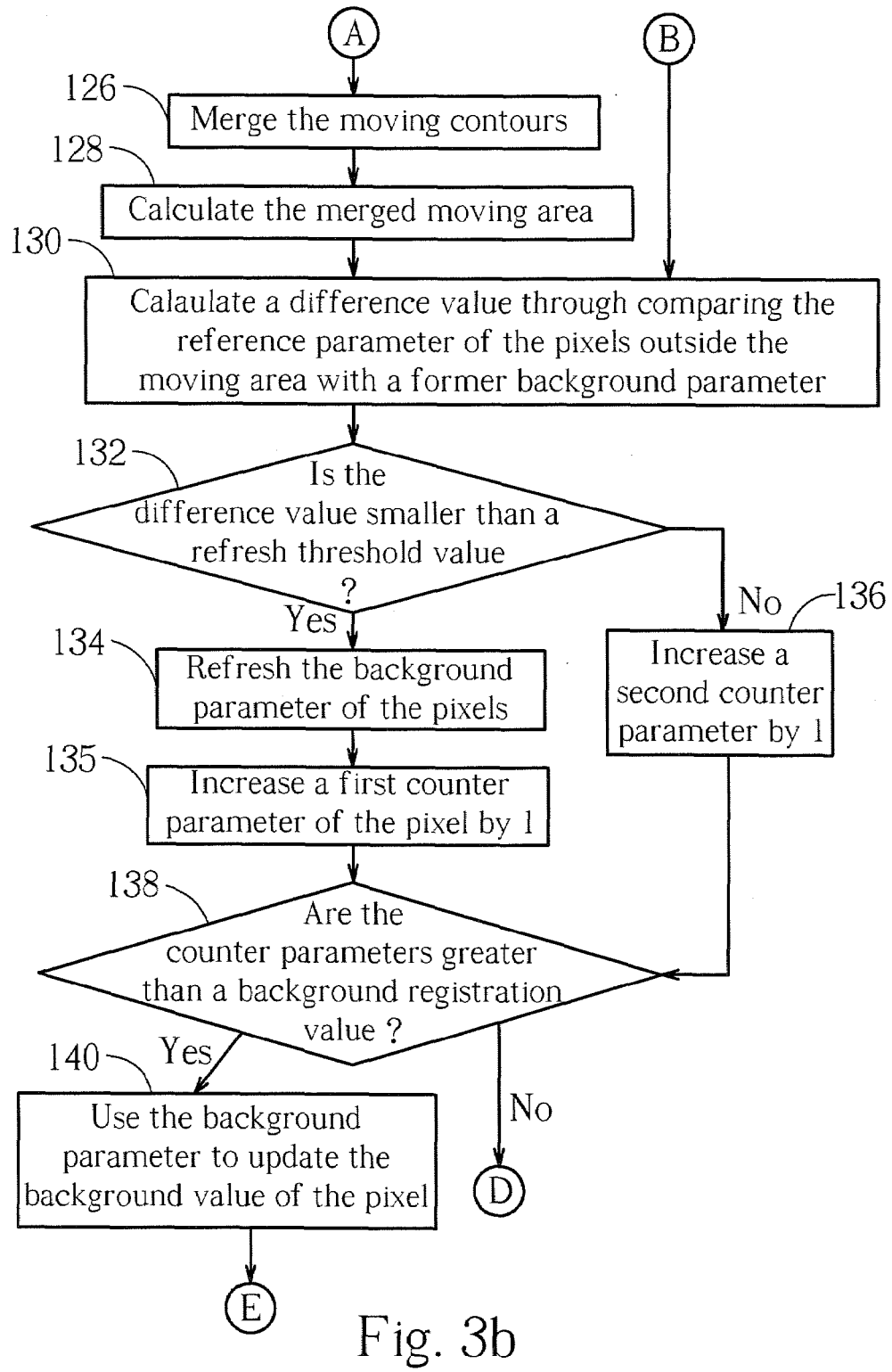
Figure 3C:
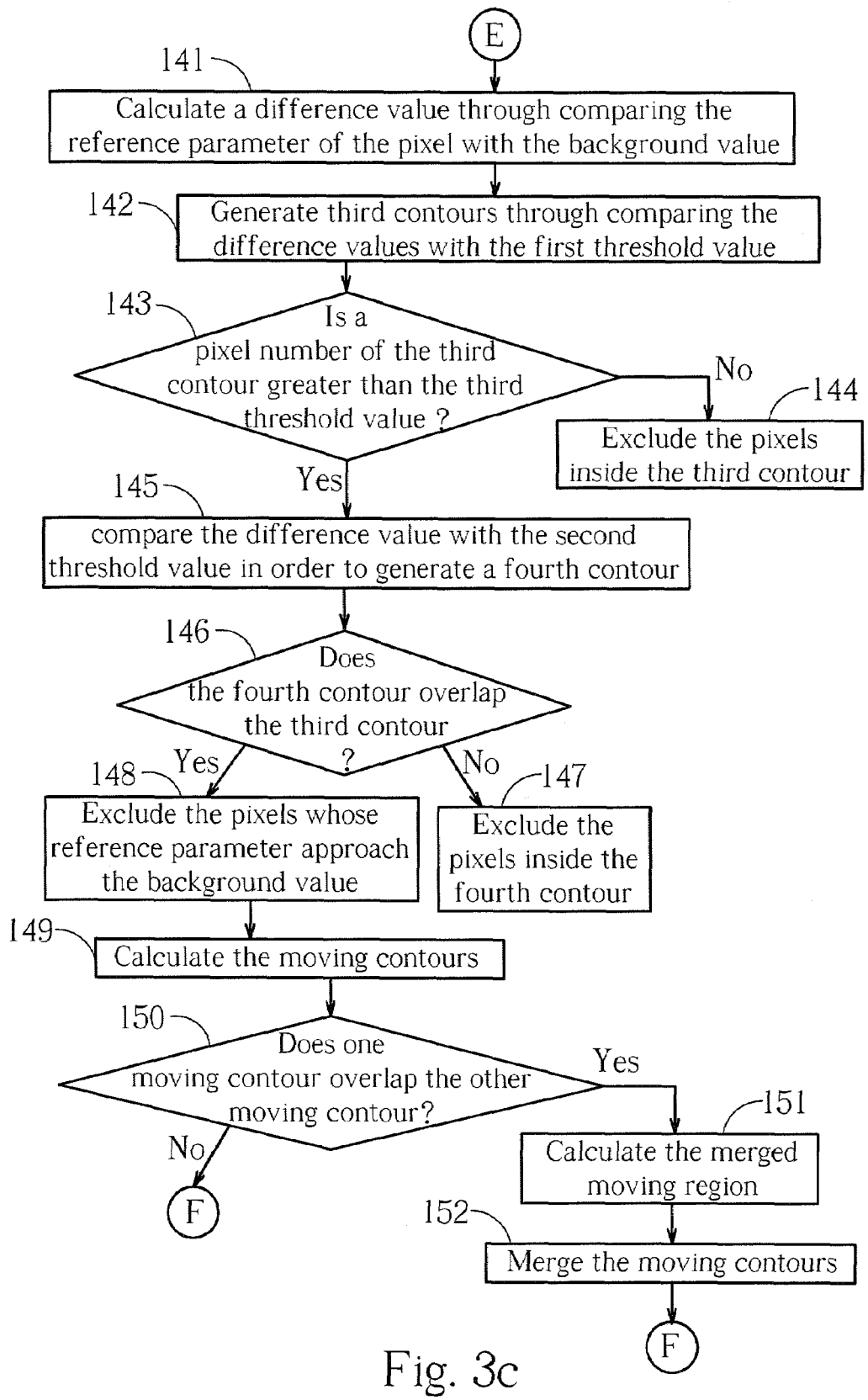
Figure 3D:
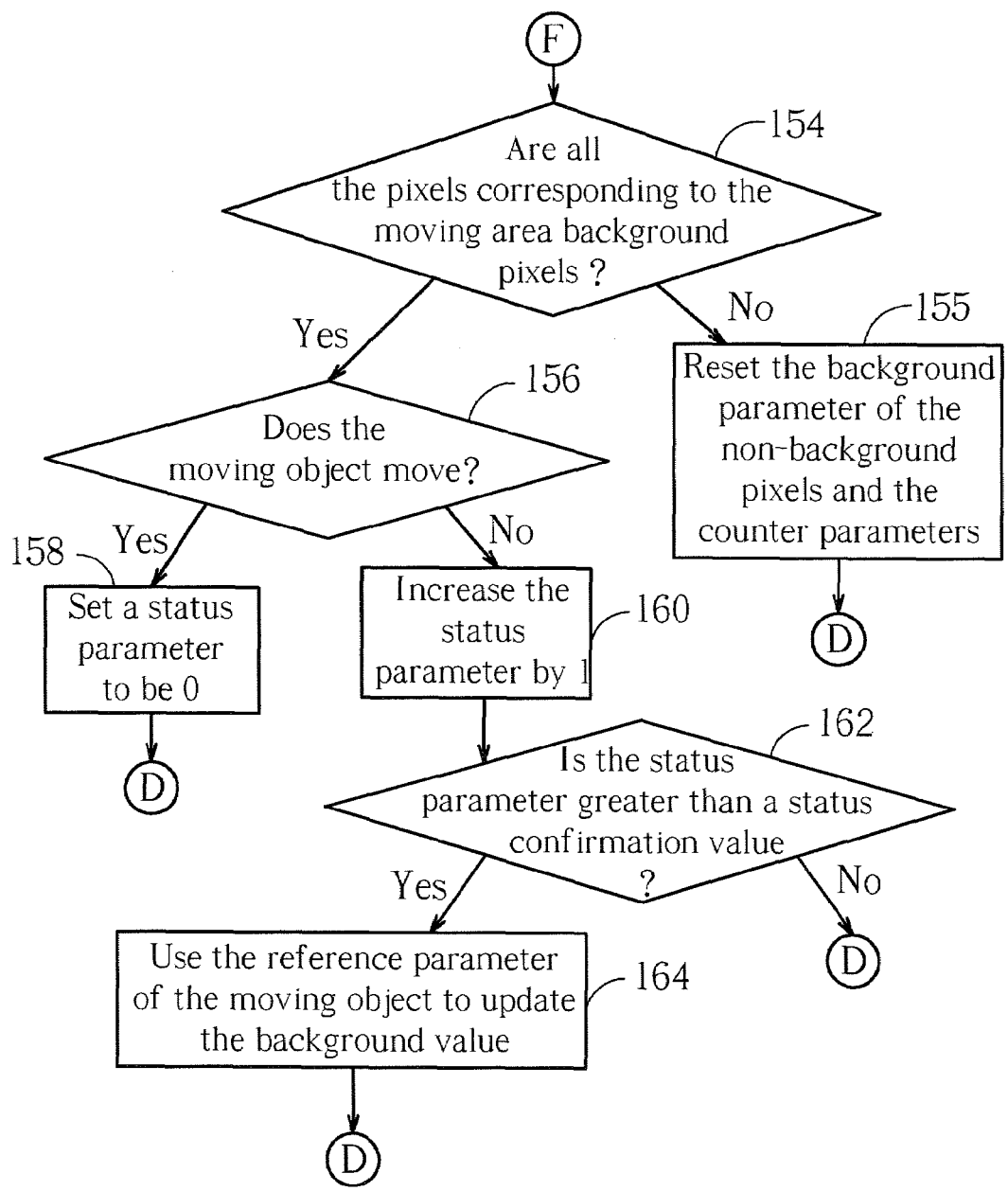

Please refer to FIGS. 3a to 3d. FIGS. 3a to 3d show a flow chart of the present invention motion detection method. The present invention motion detection method is used for the detecting system 50 shown in FIG. 1. The frame generator 20 is used to periodically picture a scene 52 according to a predetermined period to generate a plurality of image frames 22. The calculating device 30 is used to compare the first image frame 24 with the successive second image frame 26 in order to detect whether an object is moving inside the scene 52. Each image frame generated by the frame generator 20 includes a plurality of pixels. Each pixel includes a plurality of reference parameters for describing characteristics of the pixel, such as a brightness value, a gray level value, or a color temperature value of the pixel. The procedures of the present invention motion detection method are described as follows:

Step 100: Start;

Step 102: Compare the reference parameter of each pixel in the first image frame with the reference parameter of the same pixel in the second image frame to generate a corresponding difference value;

Step 104: Compare each difference value with a first threshold value;

Step 106: If there is a difference value greater than the first threshold value, execute step 108, otherwise, execute step 166;

Step 108: Generate a plurality of first contours according to pixels which are adjacent to each other and each having a difference value greater than the first threshold value;

Step 110: If a number of the pixels inside each first contour is greater than a third threshold value, execute step 114, otherwise, execute step 112;

Step 112: Exclude the pixels corresponding to the first contours;

Step 114: Compare each difference value with a second threshold value, the second threshold value is smaller than the first threshold value;

Step 116: Generate a plurality of second contours according to the pixels which are adjacent to each other and each having a difference value greater than the second threshold value;

Step 118: If the pixels in the second contour overlap the pixels in the first contour, execute step 122, otherwise, execute step 120;

Step 120: Exclude the pixels inside the second contour;

Step 122: Generate a corresponding moving contour for each second contour, the moving contour is a rectangle with a smallest area that surrounds the second contour;

Step 124: If one moving contour overlaps another moving contour, execute step 126, otherwise, execute step 130;

Step 126: Merge the moving contours;

Step 128: Calculate the merged moving area, the moving area is generated by executing horizontal and vertical scans on the second contours and performing the OR operation on each region;

Step 130: Compare the reference parameter of the pixels outside the moving area with a former background parameter to generate a corresponding difference value;

Step 132: If the difference value is smaller than a refresh threshold value, execute step 134, otherwise, execute step 136;

Step 134: Refresh the background parameter of the pixels;

Step 135: Increase a first counter parameter of the pixel by 1, execute step 138;

Step 136: Maintain the background parameter of the pixel if the first counter parameter is greater than 0, otherwise, if the first counter parameter is equal to 0, update the background parameter of the pixel with the reference parameter of the corresponding pixel in the second image frame 26, and increase a second counter parameter by 1;

Step 138: If the first or second counter parameter of the pixel is greater than a background registration value, execute step 140, otherwise, execute step 102;

Step 140: The pixel is registered, if the first counter value is greater than the background registration value, use the background parameter of the pixel to be the background value of the pixel, if the second counter parameter is greater than the background registration value, use the reference parameter of the pixel in the second image frame 26 to be the background value;

Step 141: Compare the reference parameter of each pixel outside the moving area corresponding to the second contour with the background value to generate a corresponding difference value;

Step 142: Generate third contours according to the pixels which have difference values greater than the first threshold value;

Step 143: If a number of the pixels inside each third contour is greater than the third threshold value, execute step 145, otherwise, execute step 144;

Step 144: Exclude the pixels inside the third contour;

Step 145: Compare the difference value of the background value corresponding to each pixel with the second threshold value in order to generate a fourth contour;

Step 146: If the pixel in the fourth contour overlaps the corresponding pixel in the third contour, execute step 148, otherwise, execute step 147;

Step 147: Exclude the pixels inside the fourth contour;

Step 148: Exclude the pixels whose reference parameters approach the background value inside the moving area corresponding to the second contour;

Step 149: Generate the corresponding moving contours according to each second contour and fourth contour, respectively, the moving contour is a rectangle with a smallest area that surrounds the second contours or fourth contours;

Step 150: If one moving contour overlaps the other moving contour, execute step 126, otherwise, execute step 130;

Step 151: Merge the moving contours;

Step 152: Calculate the merged moving area, the moving area is generated by executing horizontal and vertical scans on the second contours and performing the OR operation on each region;

Step 154: If all the pixels inside each moving area are registered as the background pixels, execute step 156, otherwise, execute step 155;

Step 155: Set the first and second counter parameters of the pixels which are not registered as background pixels to be 0, and use the reference parameter of the pixels in the second image frame 26 to be the background parameter, go back to step 102;

Step 156: If the moving object inside the moving area moves in the first and second image frame 24, 26, execute step 158, otherwise, execute step 160;

Step 158: A status parameter corresponding to the second contour is set to be 0, go back to step 102;

Step 160: Increase the status parameter corresponding to the second contour by 1;

Step 162: If the status parameter is greater than a status confirmation value, execute step 164, otherwise, execute step 102;

Step 164: Use the reference parameter of the pixels inside the second contour to update the background value of the pixels, and go back to step 102;

Step 166: If the difference value is smaller than a refresh threshold value, execute step 168, otherwise, execute step 102; and Step 168: Use the reference parameter of the pixels whose counter parameters reach the background registration value to update the background value of the pixels, go back to step 102.

Figure 4:
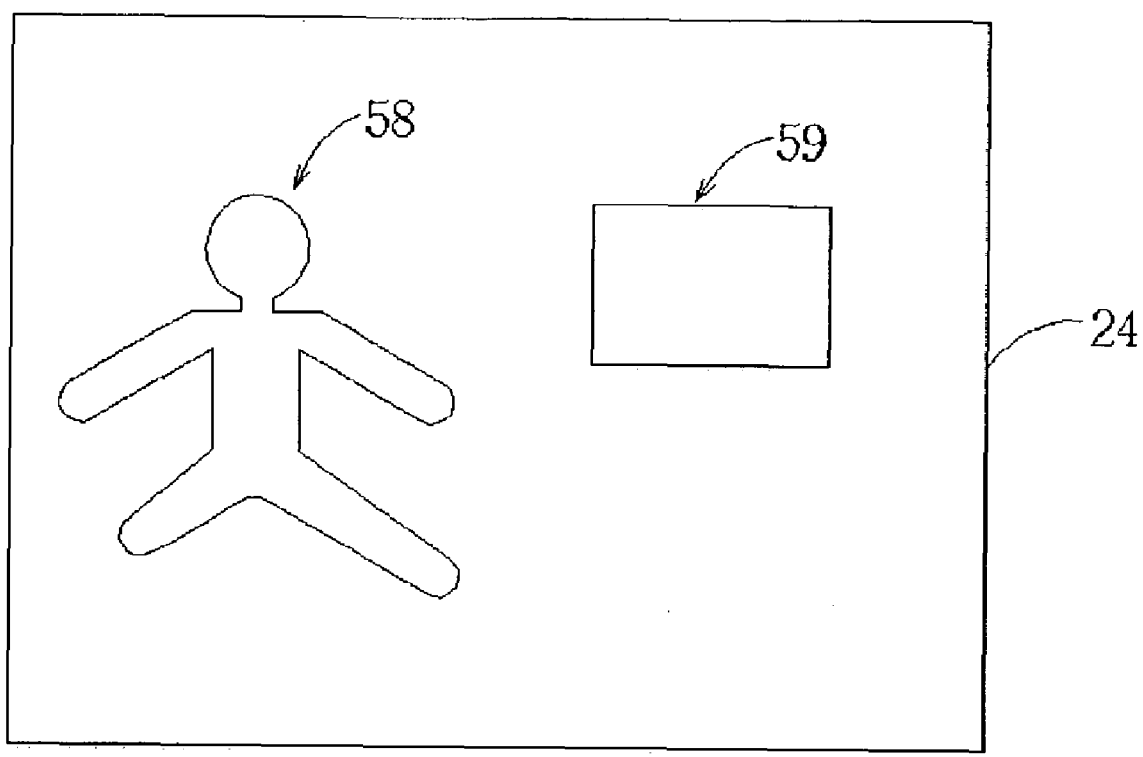
FIG. 4 is a perspective view of a first image frame.
Figure 5:
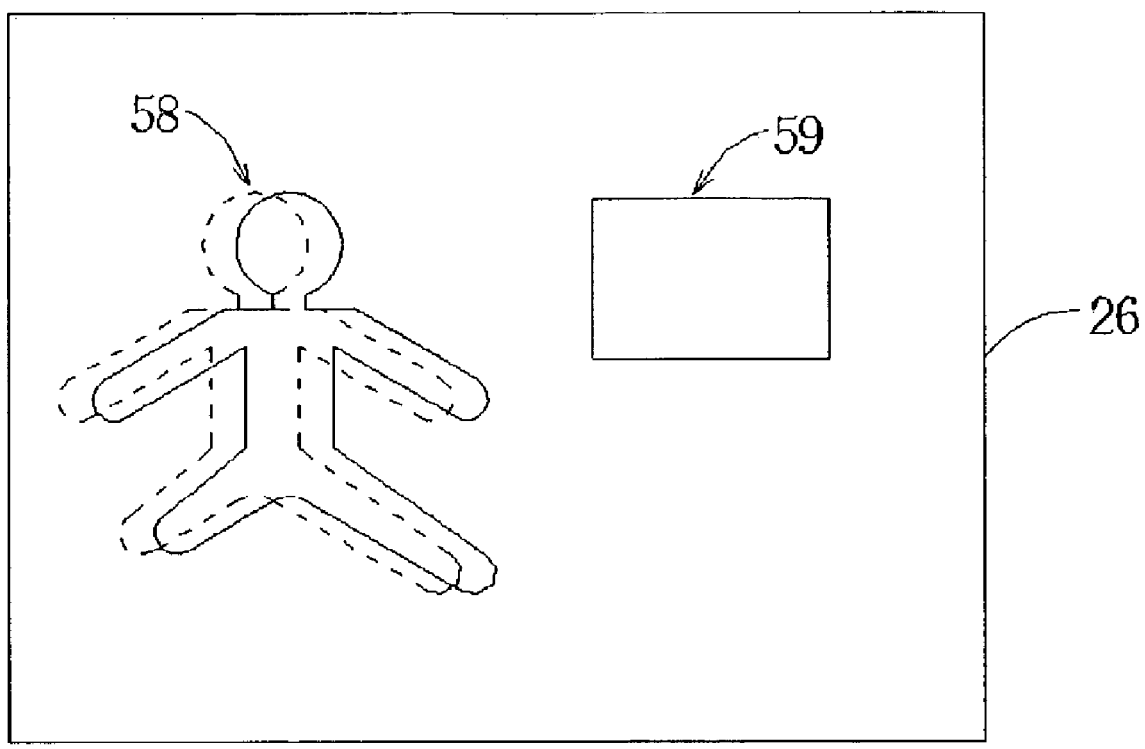
FIG. 5 is a perspective view of a second image frame.

An operation of the present invention motion detection method is illustrated as follows. Please refer to FIG. 4 to FIG. 10. FIG. 4 is a perspective view of the first image frame 24. FIG. 5 is a perspective view of the second image frame 26. FIG. 6 to FIG. 10 are perspective views of executing procedures of the present invention motion detection method. The first image frame 24 and the second image frame 26 are two successive image frames 22 generated when the frame generator 20 pictures the same scene 52. Therefore, each pixel in the first image frame 24 corresponds to the pixel in the second image frame 26. The first image frame 24 and the second image frame 26 include a moving object 58 and a fixed background object 59. If the moving object 58 is moving in the two successive image frames 22, a location of the moving object in the image frames 22 is changed. Thus, the corresponding pixels in the two successive image frames 22 are changed. First of all, compare each pixel in the first image frame 24 with the corresponding pixel in the second image frame 26 so as to generate a difference value. For example, compare the gray level value of each pixel in the first image frame 24 to the corresponding pixel in the second image frame 26 so as to find the pixels whose gray levels have changed. These changed pixels are probably generated by the moving object. In order to find the range of the moving object, the present invention uses a first threshold value and a second threshold value to filter these difference pixels. The first threshold value is greater than the second threshold value. Using the first threshold value to filter the difference pixels can obtain an accurate result, as fine lines show in FIG. 6. The fine lines are formed by little pixels. A larger error is generated if the second threshold is used to filter the difference pixel, as thick lines show in FIG. 7. The thick lines are formed by large pixels. After filtering with the first threshold value, the adjacent difference pixels form a plurality of first contours 60a, 60b, 60c, 60d, 60e. Each first contour 60a, 60b, 60c, 60d, 60e include the plurality of difference pixels. In addition to the moving object 58, a change of environment (such as a shadow) will also change the pixels in the first image frame 24 and the second image frame 26. For example, a shadow shining on the fixing object 59 is changed by the movement of the moving object 58, such as the first contours 60c, 60d, 60e. Similarly, after filtering by the second threshold value, the adjacent difference pixels generate a plurality of second contours 62a, 62b, 62c, 62d, 62e, 62f. Each second contour 62a, 62b, 62c, 62d, 62e, 62f include the plurality of difference pixels. In addition to the moving object 58, the small change of environment (such as a shadow) will also change the pixels in the first image frame 24 and the second image frame 26, such as the second contours 62c, 62d, 62e, 62f. Since the second threshold value is smaller than the first threshold value, the pixels in the first contours 60a, 60b, 60c, 60d, 60e are also contained in the second contours 62a, 62b, 62c, 62d, 62e, 62f. For example, the pixels in the first contour 60a are also contained in the corresponding second contour 62a. Each fine line shown in FIG. 6 corresponds to a thick line shown in FIG. 7. The range (a number of pixels) of each thick line is greater than that of the corresponding fine line.

Figure 10:
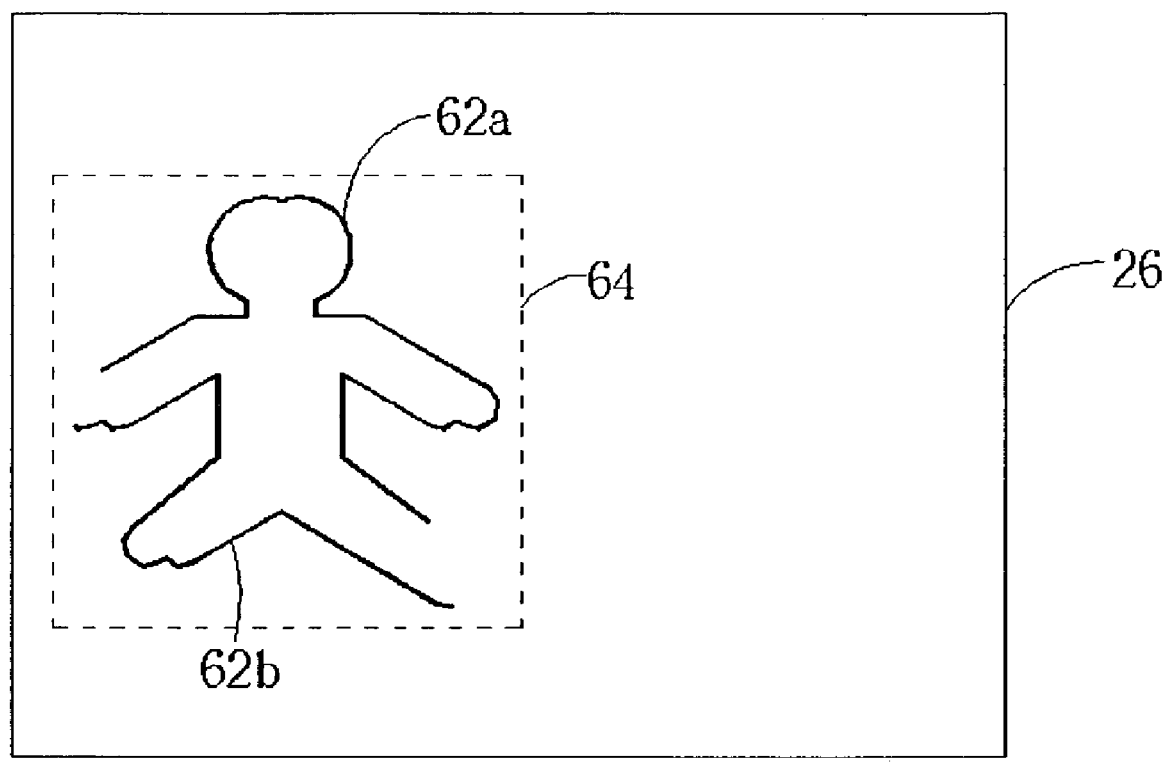

Since change of environment will also cause the pixels in the first and second image frames 24, 26 to change, the present embodiment uses a third threshold value to filter these pixels. Please refer to FIG. 6 and FIG. 7. The difference pixels generated by the non-moving object (caused by the change of the environment) do not easily form a large continuous concentration. Therefore, the present invention uses the third threshold value to filter the contours which have little pixels. That means the present invention uses the third threshold value to filter the first contours 60a, 60b, 60c, 60*d*, 60*e* and the second contours 62*a*, 62*b*, 62*c*, 62*d*, 62*e*, 62*f* which have numbers of pixels less than the third threshold value. The mixed signals with small contour areas generated by small environment changes are filtered by the third threshold value. Therefore, the first contours 60*c*, 60*d*, 60*e* and the second contours 62*c*, 62*d*, 62*e*, 62*f* are filtered by the third threshold value for having little pixels. Although the second contour 62*f* does not belong to the moving object 58, since the pixel number of the second contour 62*f* is larger than the third threshold value, the second contour 62*f* is not filtered. The range of the moving object 58 is approximately found through the first threshold value and the third threshold value. However, the first threshold value excessively filters a portion of pixels of the moving object 58 which have the difference value less than the first threshold value. Therefore, the present invention further processes the result generated by using the second and third threshold values and the result generated by using the first and third threshold values. The second contours 62*a*, 62*b* which overlap the first contours 60*a*, 60*b* are picked out from the second contours 62*a*, 62*b*, 62*f*, as shown in FIG. 10. The second contours 62*a*, 62*b* represent the change generated by the movement of the moving object 58 in the first image frame 24 and the second image frame 26. The second contours 62*a*, 62*b* also represent the moving area of the moving object 58 in the first and second image frame 24, 26.

Figure 6:
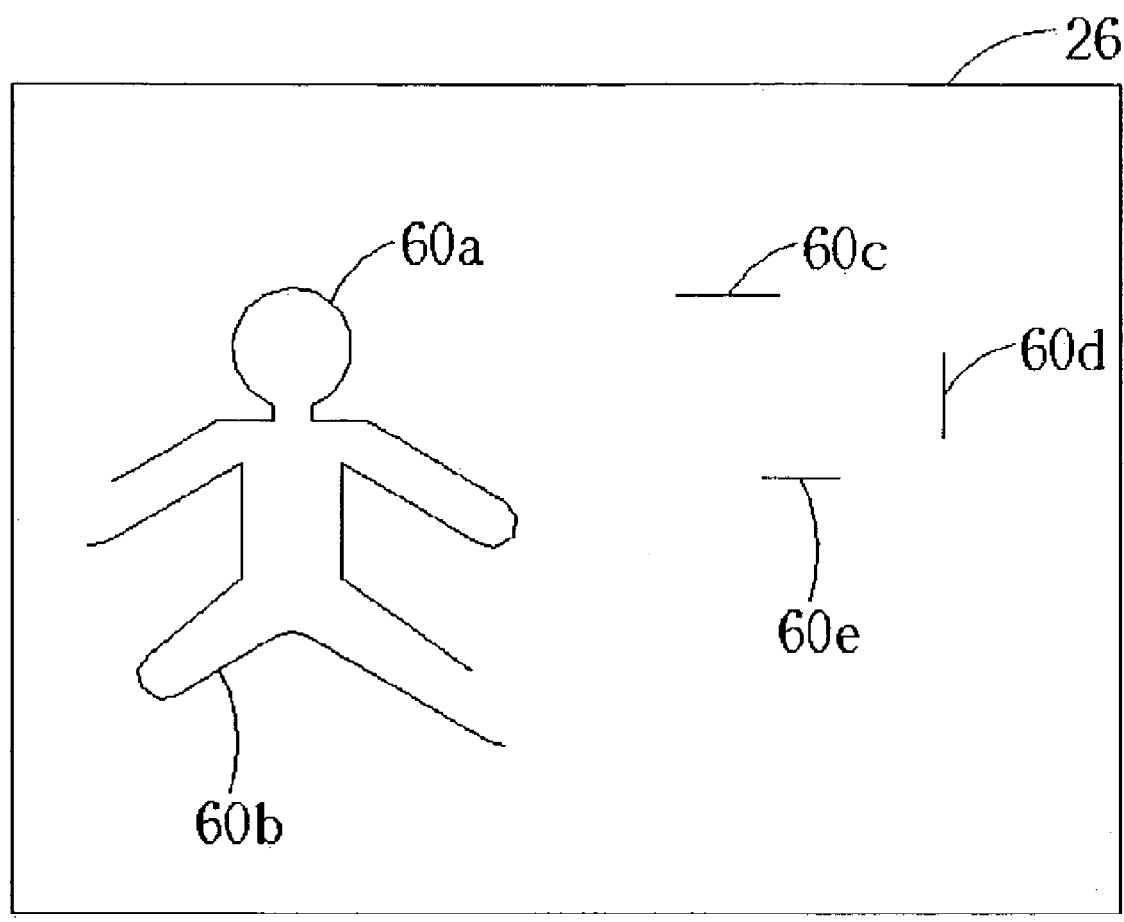
FIG. 6 to FIG. 10 are perspective views of executing procedures of the present invention motion detection method.
Figure 7:
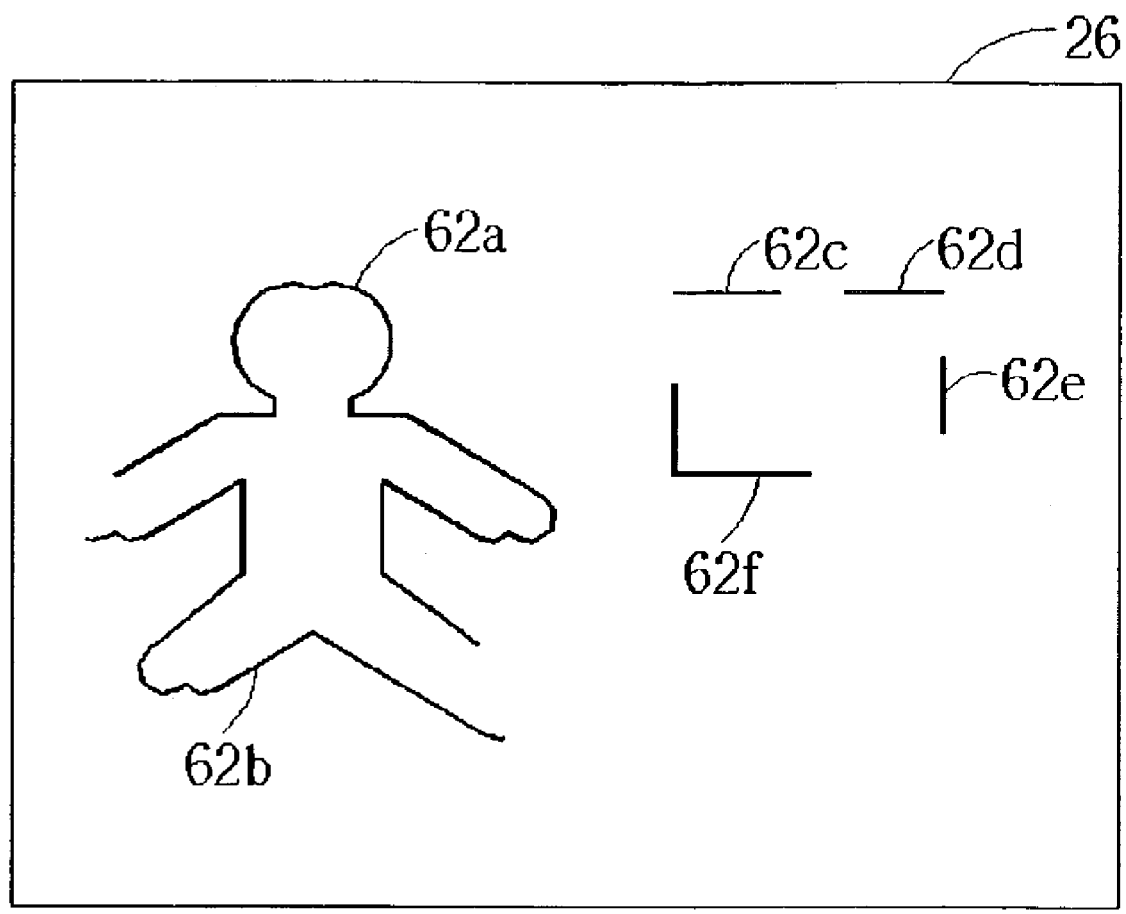
Figure 8:
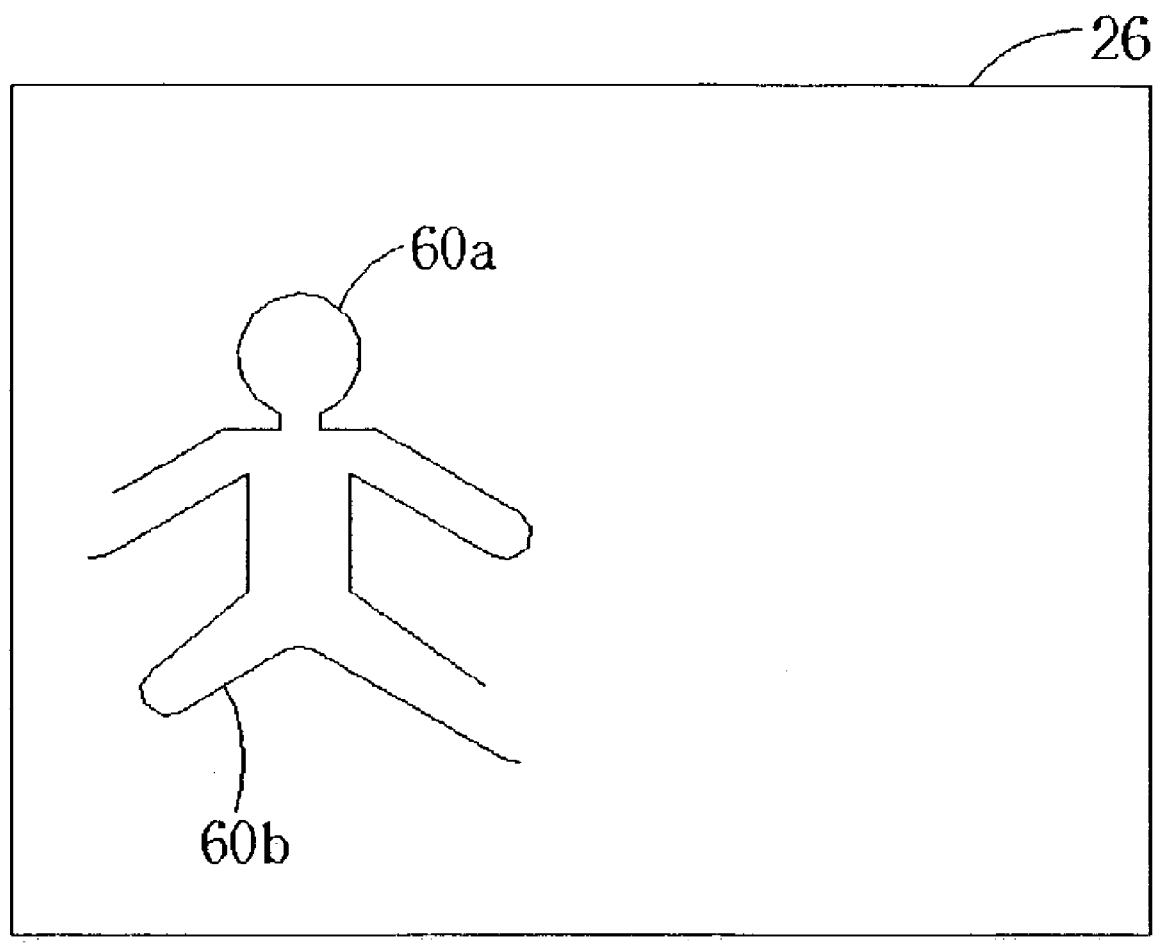
Figure 9:
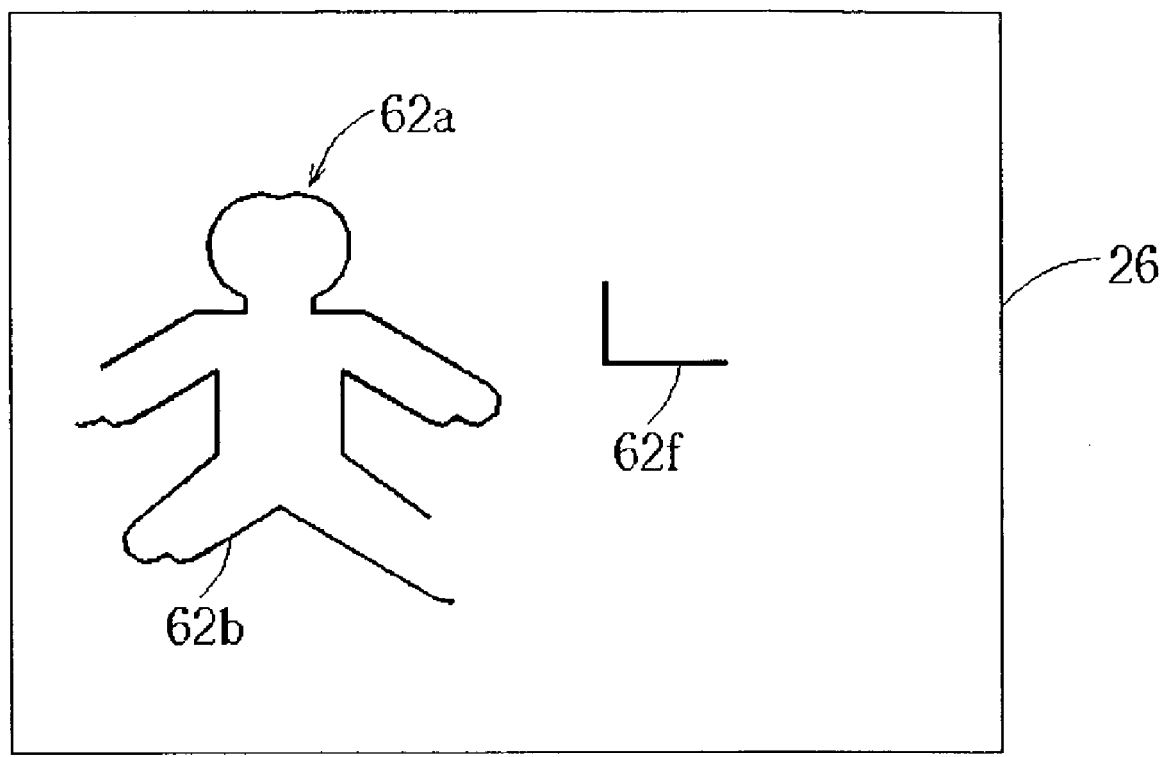
Figure 11:
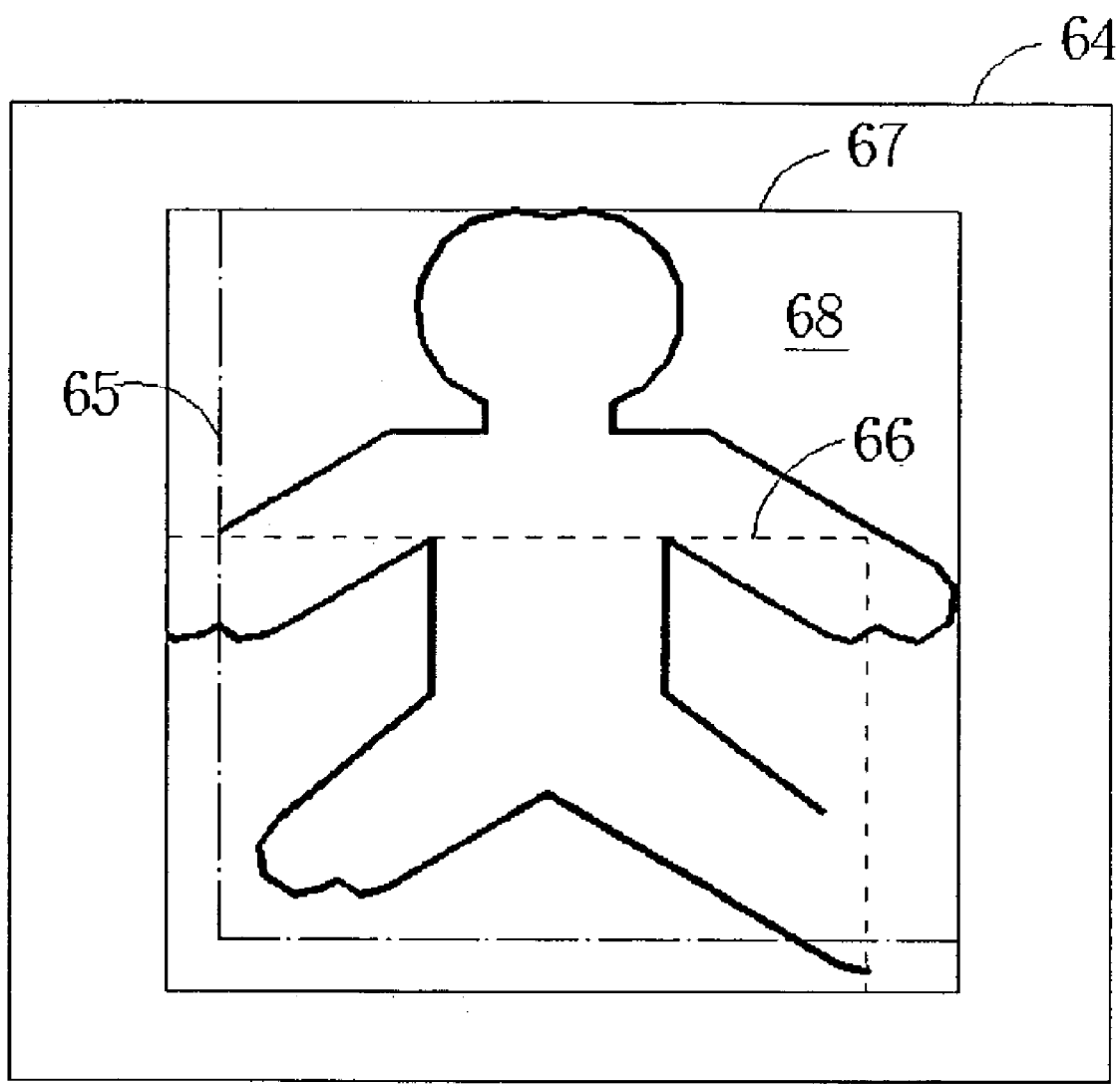
FIG. 11 is an enlarged diagram of FIG. 10.
Figure 12:
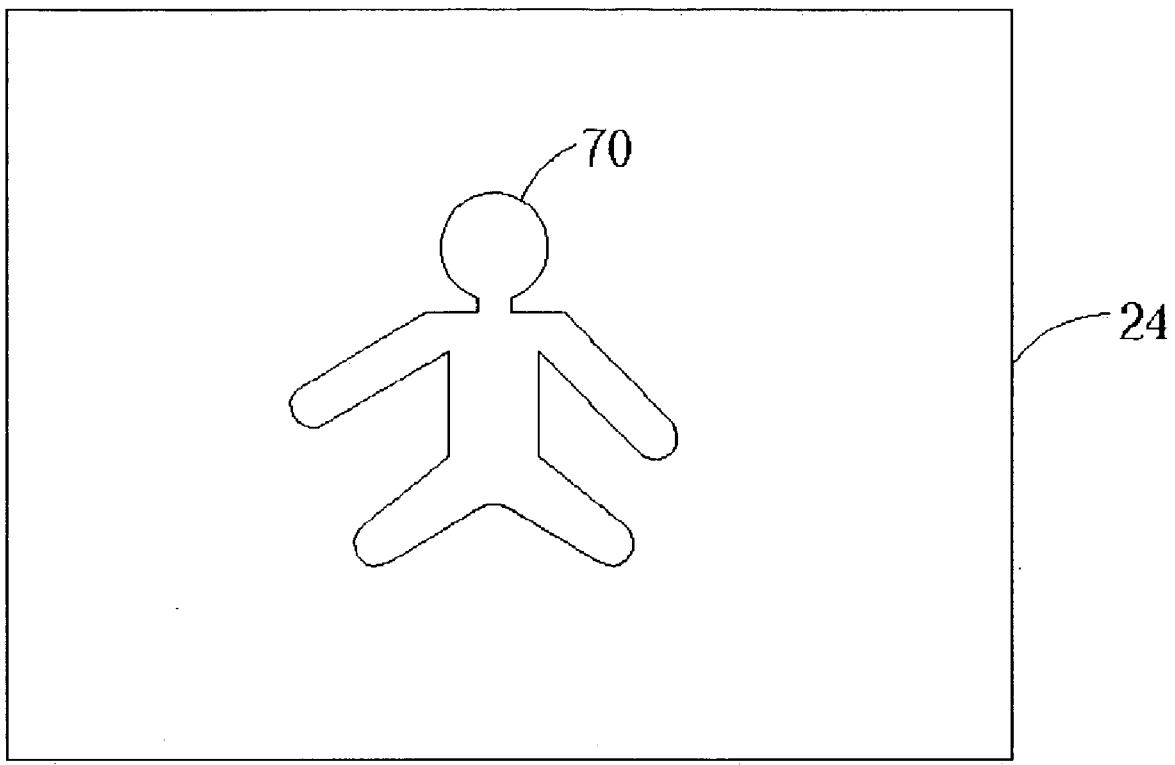
FIG. 12 to FIG. 17 are perspective views of the present invention motion detection method in which the method uses background data to detect the range of the moving object.
Figure 13:
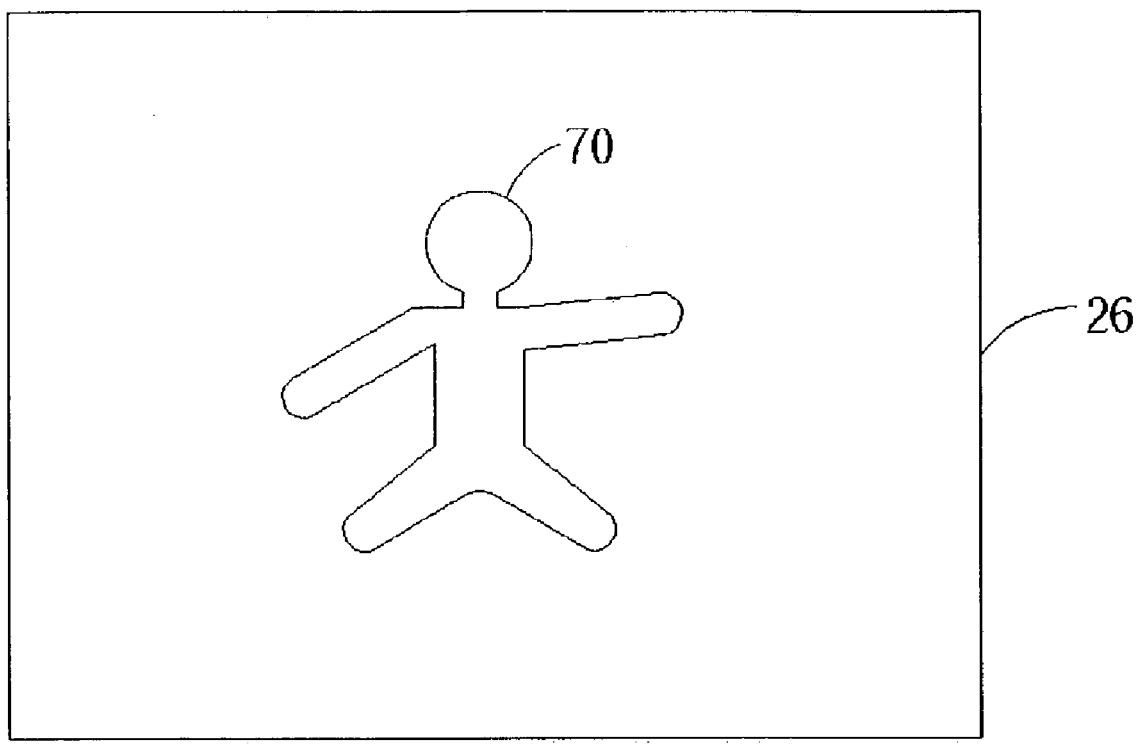
Figure 14:
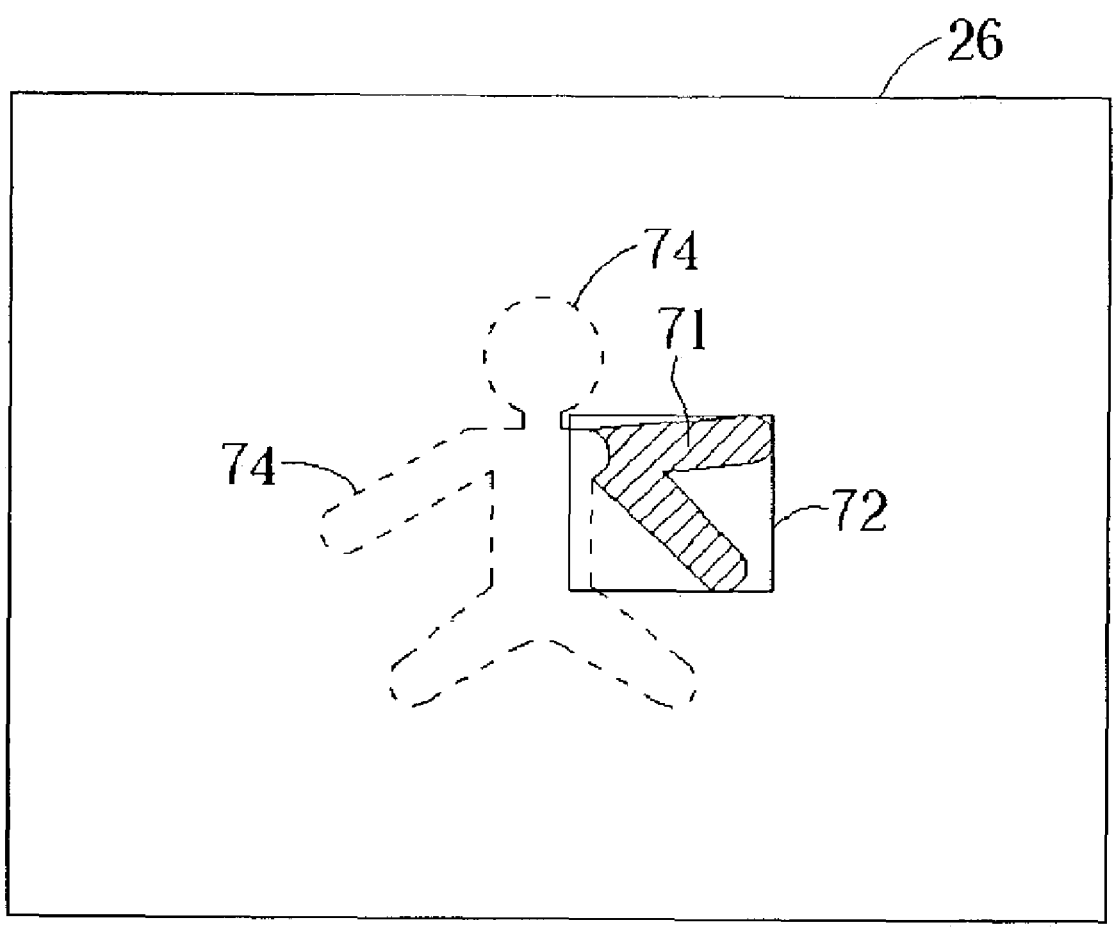
Figure 15:
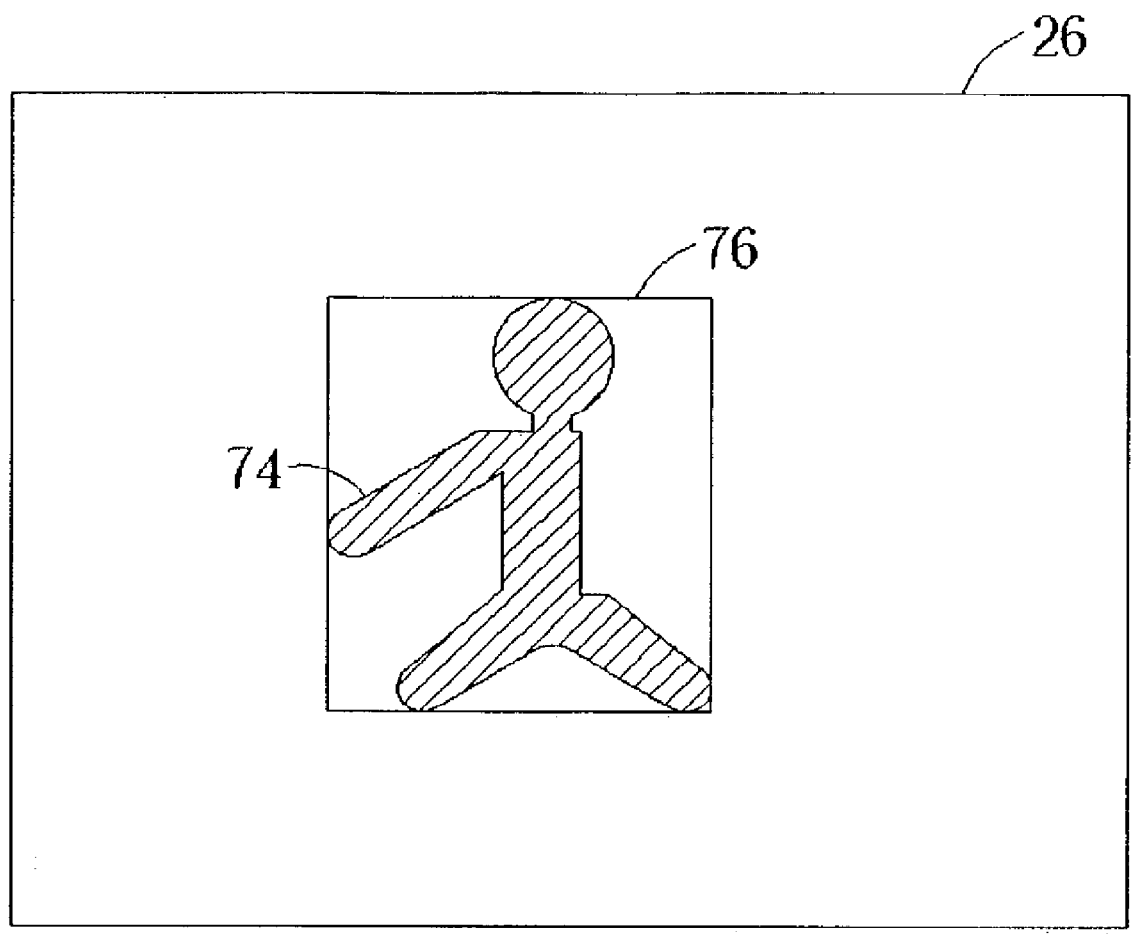
Figure 16:
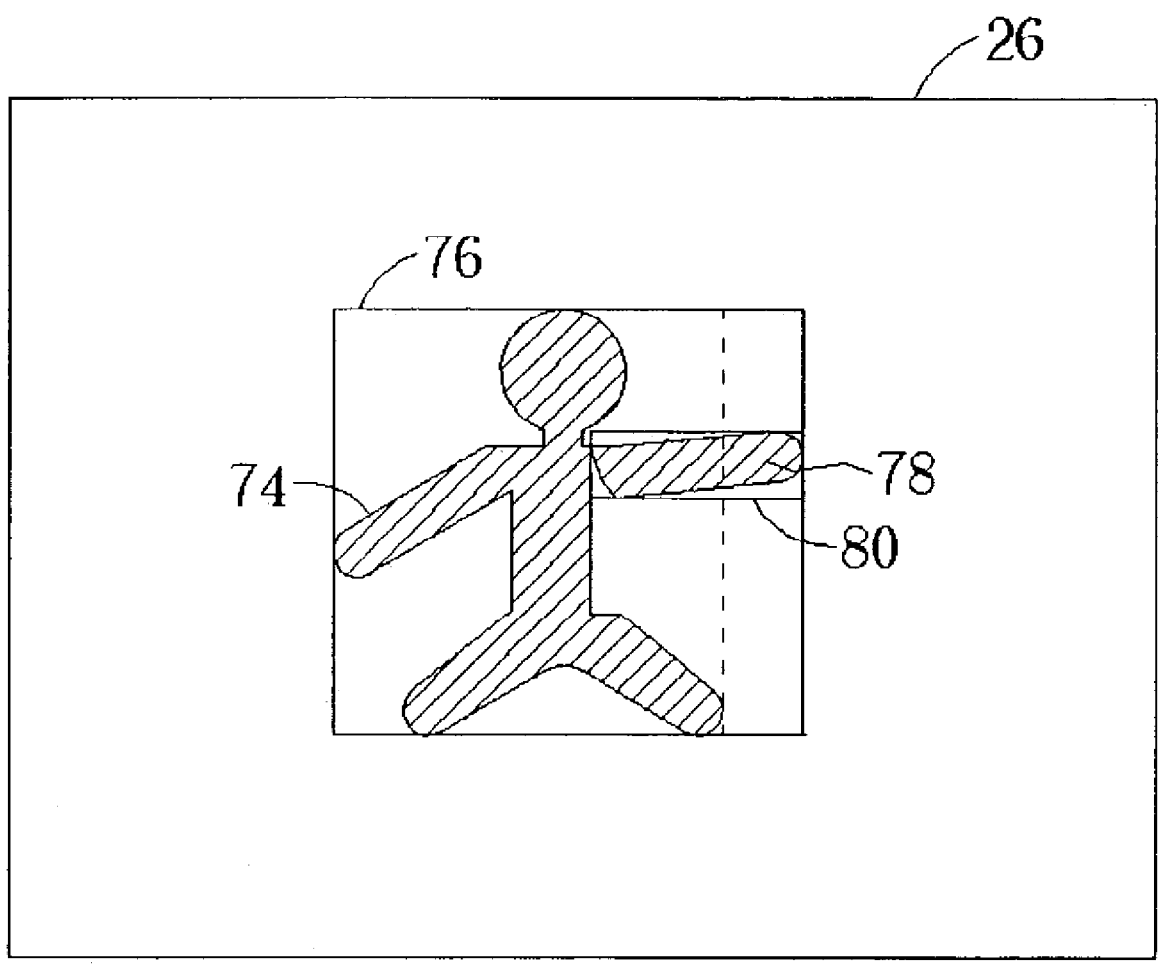
Figure 17:
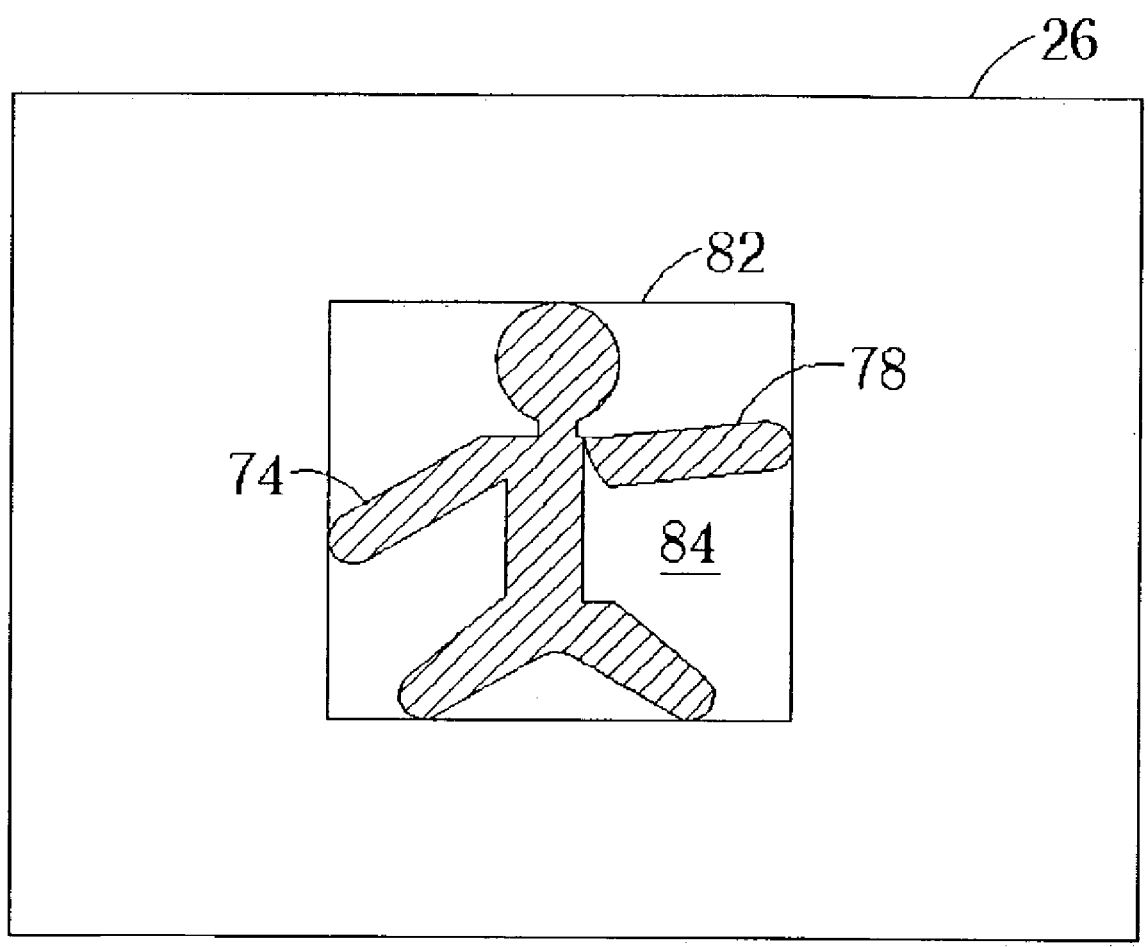

Please notice that, the present invention can also use the third threshold value to filter the first contours 60*a*, 60*b*, 60*c*, 60*d*, 60*e* shown in FIG. 6 only. Then the filtered result is compared with the second contours 62*a*, 62*b*, 62*c*, 62*d*, 62*e*, 62*f* shown in FIG. 7 to obtain the second contours 62*a*, 62*b*, as shown in FIG. 11. The conclusion is the present invention can use the first, second, and third threshold values to find the range of the moving object.

Please refer to FIG. 11. FIG. 11 is an enlarged diagram of FIG. 10. The second contours 62*a*, 62*b* are included inside a region 64. Although the second contour 62*a* is not connected to the second contour 62*b*, both the second contours 62*a* and 62*b* are generated by the movement of the moving object 58. Actually, the second contours 62*a*, 62*b* correspond to the moving object 58 and relate to each other. In order to find the range of the moving object 58 in the second image frame 26, the present invention embodiment finds a moving contour of each moving object 58 in the second image frame 26 first. Horizontal and vertical scans of the second contours are executed inside the moving contour. Then OR operations are performed to obtain the moving area. The operation is illustrated as follows. First of all, moving contours 65, 66 are generated corresponding to the second contours 62*a*, 62*b*. Each moving contour 65, 66 is a rectangle with a smallest area that surrounds the corresponding second contour 62*a*, 62*b*. Then, determine whether the moving contours 65, 66 overlap each other. That means whether boundaries of the moving contours 65, 66 intersect each other. Merge the overlapped portion of the moving contour. As shown in FIG. 11, each moving contour 65, 66 has an overlapped portion. Last, execute horizontal and vertical scans on the second contour 62*a*, 62*b*, and perform the OR operation to obtain the moving area 68. The moving area 68 is surrounded by the moving contour 67. The moving contour 67 is a rectangle with a smallest area that surrounds the overlapped moving contours 65, 66. The moving contour 67 defines the approximately moving area 68 of the moving object 58 in the second image frame 26. The present invention uses the separation characteristics of different moving object 58, and the continuous and adjacent characteristics of the same moving object 58 to obtain the plurality of moving contours 67. Each moving contour 67 corresponds to different moving objects 58. Therefore, the different moving objects 58 can be separated.

In the second image frame 26, the change of the pixels outside the moving contour 67 is very small. The difference of the pixels is less than the second threshold value. Thus, the pixels outside the moving contour 67 may be the stationary background. The present embodiment uses a background parameter, a first counter parameter, and a second counter parameter to process the pixels which may be the background. Each pixel corresponds to a background parameter, a first counter parameter, and a second counter parameter. When the detecting system 50 starts to operate and the frame generator 20 generates the first image frame 24, the reference parameter of each pixel is an initial value of the background parameter, and the first and second counter parameters are set to be 0. The present invention compares the reference parameter of the pixels outside the each moving area 68 with the corresponding background parameter so as to generate a difference value. If the difference value is smaller than a refresh threshold value, increase the corresponding first counter parameter by 1, and take an average of the corresponding reference parameter and background parameter to update the background reference. Otherwise, if the difference value is larger than the refresh threshold value, increase the corresponding second counter parameter by 1. And, if the first counter parameter is not equal to 0, do not change the background parameter, otherwise, use the present reference parameter of the pixel to update the background parameter. When the first or second counter parameter of the pixel is larger than a background registration value, the pixel is registered as a background pixel. If the first counter parameter is larger than the background registration value, use the updated background parameter to be the background value of the pixel. If the second counter parameter is larger than the background registration value, use the reference parameter of the pixel to be the background (parameter) value. For example, the refresh threshold value of a pixel is n−1. When the detecting system 50 starts to operate and the frame generator 20 generates the first image frame, the reference parameter of the pixel is X1 and the background parameter Z1 is equal to the reference parameter. That means Z1 is equal to X1. The initial values of the first and second counter parameter are 0. When the frame generator 20 generates the second image frame, the pixel is calculated to be located outside the moving area. The reference parameter of the pixel in the second image frame 26 is X2. If the difference value between X2 and Z1 is less than the refresh threshold value, the background parameter of the pixel is updated to be Z2. Z2=(X2+Z1)/2. The first counter parameter is increased by 1, and the second counter parameter remains at 0. The frame generator 20 generates a third image frame and the pixel is calculated as being located outside the moving area. A reference parameter of the pixel in the third image frame is X3. If a difference value between X3 and Z2 is smaller than the refresh threshold value, the background parameter of the pixel is updated to be Z3. The new background parameter can be the average of the former background parameter and the reference parameter of the pixel, Z3=(X3+Z2)/2. The new background parameter can also be generated by multiplying the former background parameter and the counter parameter (the first or second counter parameter) and then dividing by the updated counter parameter (the first or second counter parameter), that means Z3=(X1+X2+X3)/3. The new background parameter can also be generated by other averaging operations. Now, the first counter parameter is 2, and the second counter parameter remains at 0. The frame generator 20 generates an nth image frame and all of the image frames from the first image frame to the nth image frame are calculated as being located outside the moving area. Assume that the first counter parameter of the pixel is (n−1)n, the second counter parameter remains at 0, and the background parameter is updated to be Zn. The frame generator 20 generates an n+1th image frame and the reference parameter of the pixel is X(n+1). If a difference value between the background parameter Zn and the reference parameter X(n+1) is larger than the refresh threshold value, the first counter parameter remains at n−1 and the second counter parameter is increased to be 1. Since the first counter parameter is 0, the background parameter remains at Zn. If the pixel is located outside the moving area from the n+1th image frame to a 2n−1th image frame, and all difference values between the reference parameters and the background parameters are larger than the refresh threshold value, both the first and second counter parameter in the 2n−1th image frame are equal to n−1. The above processes are shown in the following table.

| Image frame | 1 | 2 | 3 | n | N + 1 | N + 2 | 2n − 1 |
|---|---|---|---|---|---|---|---|
| Reference parameter | X1 | X2 | X3 | X(N) | X(N + 1) | X(N + 2) | X(2N − 1) |
| Background parameter | Z1 | Z2 | Z3 | Zn | Zn | Zn | Zn |
| First counter parameter | 0 | 1 | 2 | N − 1 | N − 1 | N − 1 | N − 1 |
| Second counter parameter | 0 | 0 | 0 | 0 | 1 | 2 | N − 1 |

Rhe background registration value is n−1. The frame generator 20 generates a 2n image frame and the reference parameter of the pixel is X(2n). If a difference value between X(2n) and the background parameter Zn is less than the refresh threshold value, the first counter parameter is n and the second counter parameter is n−1. Since the first counter parameter is larger than the background registration value, the pixel is registered as a background pixel and the corresponding background value is the updated background parameter Z(n+1). The operation is same as the operation mentioned above. However, if the difference between X(2n) and Zn is larger than the refresh threshold value, the first counter parameter is n−1 and the second counter parameter is n. Since the second counter parameter is larger than the background registration value, the pixel is registered as a background pixel and the corresponding background value is the reference parameter X(2n). If the pixel in the 2nth image frame is located in the moving area, the first and second counter parameter are set back to 0 and the reference parameter X(2n)is used to update the background parameter. Repeat the background registering process mentioned above from the 2n+1th image frame. Therefore, the registering process must re-start again if the pixel is calculated as being located inside the moving area before being registered as a background pixel. In addition, if the pixel in the second image frame is located outside the moving area, and the difference value between the reference parameter X2 and the background parameter Z1 is larger than the refresh threshold value, since the first counter parameter is 0, the background parameter Z1 is updated by the reference parameter X2 and the second counter parameter is increased to be 1.

The moving area 68 shown in FIG. 11 includes not only the moving object 58, but also the background portion. In addition, the pixels of the background portion sheltered by the moving object 58 change when the moving object 58 is moving. Therefore, the present invention compares the reference parameter of the pixel which is registered as the background pixel inside the moving area 68 with the corresponding background value, so as to determine whether the changed portion (the reference parameter of the pixels are changed) includes the background portion. Thus, the background portion inside the moving area 68, which appears when the moving object 58 is moving, can be filtered by comparing the reference parameter of the pixels which are registered as background pixels with the corresponding background value. The moving object 58 can be detected accurately. Therefore, the present invention motion detection method executes the background registering process first, and then uses the data of the pixels which are registered as background pixels to differentiate between the moving object 58 and the background portion generated by the movement of the moving object 58. For example, a portion of a moving object is moving, and the other portion keeps stationary. The moving portion can be detected by comparing two successive image frames, and the stationary portion can be detected according to the background data. Please refer to FIG. 12 to FIG. 17. FIG. 12 to FIG. 17 are perspective views of the present invention motion detection method in which the method uses the background data to detect the range of the moving object. A portion of a moving object 70 is moving in the first image frame 24 and the second image frame 26. After comparing the first image frame 24 and the second image frame 26, a moving contour 72 corresponding to the moving portion 71 is detected. However, the non-moving portion 74 must be detected through the background pixels. The present embodiment compares the reference parameter of the pixels outside the moving contour 72 with the background value, as mentioned in steps 141 to 147. Thus, a moving contour 76 corresponding to the non-moving portion 74 can be detected through the background pixels. Compare the reference parameter of the pixels in the moving portion 71 with the background value so as to exclude the pixels whose reference parameters are near the background value. Thus, a moving portion 78 and a corresponding moving contour 80 are detected. Execute the steps 149 to 152. Perform the horizontal and vertical scans on the moving portion 78 in the moving contour 80 and the non-moving portion 74 in the moving contour 76 so as to obtain a moving contour 82. A moving area 84 corresponding to the moving contour 82 marks out the position of the moving object 70 in the second image frame 26.

Although there is the plurality of moving objects moving in the image frames, the present invention method can also filter out the background portion from the moving objects. The moving objects can be detected accurately. The present invention motion detection method selects the moving areas 67 first so as to define the different moving objects 58. Then, the background pixels are used to define the moving objects 58 in each moving area 67. Therefore, the moving objects 58 and the background portion can be detected accurately.

The detecting system 50 uses the frame generator 20 to picture a fixed scene 52 and generate the plurality of image frames 22. However, the background on the scene 52 is not invariable, the background may change. For example, when the stationary object 59 in the first image frame 24 shown in FIG. 4 falls down. A falling process is recorded in the plurality of image frames 22. The stationary object 59 is detected through the motion detection process mentioned above. However, after the stationary object 59 has fallen down, the position of the stationary object 59 is changed and the stationary object 59 becomes a portion of the background again. If the pixels of the moving object have registered as the background pixels, the moving object may become a portion of the background again after it stops moving, such as the stationary object 59. Therefore, the pixels which have been registered as the background pixels in each moving object 58 (such as the stationary object 59 falling down in a background), correspond to a status parameter. If the moving object 58 does not move in two successive image frames 22, the status parameter is increased by 1. Otherwise, the status parameter is set back to 0. When the status parameter of the moving object 58 is larger than a status confirmation value, use the reference parameter of the pixel of the moving object 58 to update the background value. The stationary object 58 becomes a portion of the background. For example, after the stationary object 59 has fallen down and stayed stationary for an interval, the stationary object 59 becomes a portion of the background again. The portion sheltered by the original stationary object 59 is registered as the background again according to the status parameter and the status confirmation value.

The background may be changed by the variation of the environment. For example, the sun shines on scene 52 so that the brightness value changes according to time. The brightness value changes slowly. Therefore, the brightness value of the background corresponding to the scene 52 must be updated so as to adjust the change generated by the sunshine. If there is not any moving object detected in the first image frame 24 and the second image frame 26, that means nothing is moving in the first and second image frame 24, 26, and the status parameters of all the stationary objects have reached the status confirmation value. At that time, the brightness value of each pixel which is registered as the background pixel is compared with the refresh threshold value. If the brightness value of the pixel is less than the refresh threshold value, use the reference parameter of the pixel to update the background value. Therefore, when the brightness changes slowly, the present invention uses the refresh threshold value to control and update the background value. The operation mentioned above can be also used to update the other reference parameters (such as the gray level value) of the pixels. Therefore, the present invention can adjust the change generated by the environment.

In contrast to the prior art, the present invention motion detection method uses the different thresholds to filter the pixels changed in two successive image frames. The present invention method uses the larger threshold value to select the region and the corresponding pixels which may be generated by moving objects. The region which has the pixel number less than a predetermined value is then excluded. Similarly, the smaller threshold value is used to select the region and the corresponding pixels which may be generated by the moving object. Exclude the region which has the pixel number less than the predetermined value. Collect the related region from the results generated through the two threshold values. In order to get the region of the moving object accurately, calculate the moving contour corresponding to each region. Determine the relation among the regions through the overlap portion. Calculate the moving contours according to the overlap block. Determining whether the moving object is moving according to the moving contour. That means, the change of the pixels inside the moving contour may be generated by the moving object. The pixels outside the moving contour may be the portion of the background. The present invention motion detection method uses the moving contour to define the region of the moving object. The moving contour determination process makes the following background registering process more accurate. After finishing the background registering process, the region of the moving object can be detected through the registered background pixels. Therefore, the present invention motion detection method uses the assistance of the background pixels to detect the moving object. Therefore, the background portion will not be detected as a portion of the moving object. The moving object can be detected accurately. The present invention motion detection method can avoid the influence of the background so that the present invention method can detect the plurality of moving objects accurately.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A moving object segmentation method used by a detecting system, comprising:

generating frames with a frame generator for periodically picturing a scene according to a predetermined period to generate a plurality of image frames, each image frame comprising a plurality of pixels, each pixel comprising at least a reference parameter for describing characteristics of the pixel; and detecting moving objects moving inside the scene according to a first image frame and a second image frame generated from the frame generator, the first image frame being generated prior to the second image frame by an interval corresponding to the predetermined period;

comparing the reference parameter of one pixel in the first image frame with the reference parameter of the same pixel in the second image frame to generate a corresponding difference value;

comparing each difference value with a first threshold value and a second threshold value, the first threshold value being greater than the second threshold value, generating a plurality of first contours according to the pixels which are adjacent to each other and each having the difference value greater than the first threshold value, and generating a plurality of second contours according to the pixels which are adjacent to each other and each having the difference value greater than the second threshold value, wherein each pixel further comprises a background parameter, a first counter parameter, and a second counter parameter, the first counter parameter being changed when a difference value between the reference parameter and the background parameter of the pixel is less than a background threshold value, and the second counter parameter being changed when the difference value between the reference parameter and the background parameter of the pixel is greater than the background threshold value;

selecting second contours that overlap the first contours for establishing a corresponding first moving area, the first moving area comprising every pixel associated with the selected second contours;

determining whether the pixels outside the first moving area in the second image frame are registered as background pixels;

comparing the reference parameter of the pixel outside the first moving area with the corresponding background parameter of the pixel to calculate the difference value;

increasing the first counter parameter by 1; and updating the background parameter of the pixel if the difference value is less than the background threshold value;

increasing the second counter parameter by 1; and updating the background parameter of the pixel if the difference value is greater than the background threshold value; and comparing the reference parameter of the background pixel in the second image frame with a corresponding background value of the background pixel to determine whether the background pixel is related to the moving object.

2. The moving object segmentation method of claim 1 wherein when the difference value is greater than the background threshold value and the first counter parameter is equal to an initial counter value, the reference parameter of the pixel is used to update the corresponding background parameter.

3. The moving object segmentation method of claim 2 wherein when the difference value is greater than the background threshold value and the first counter parameter is not equal to the initial counter value, the background parameter of the pixel is maintained.

4. The moving object segmentation method of claim 3 wherein the background parameter after being updated is generated by multiplying the background parameter before being updated and either the first or second counter parameters before being updated together to generate a product first and then dividing the product by the corresponding first or second counter parameters after being updated.

5. The moving object segmentation method of claim 4 wherein when either of the first or second counter parameters is greater than a background registration value, the corresponding pixel is registered as a background pixel.

6. The moving object segmentation method of claim 5 wherein if the first counter parameter is greater than the background registration value, the background parameter after being updated is assigned to be a corresponding background value of the background pixel.

7. The moving object segmentation method of claim 5 wherein if the second counter parameter is greater than the background registration value, the reference parameter of the pixel is assigned to be a corresponding background value of the background pixel.

8. A moving object segmentation method used by a detecting system, comprising:

generating frames with a frame generator for periodically picturing a scene according to a predetermined period to generate a plurality of image frames, each 25 image frame comprising a plurality of pixels, each pixel comprising at least a reference parameter for describing characteristics of the pixel; and device for detecting moving objects moving inside the scene according to a first image frame and a second image frame generated from the frame generator, the first image frame being generated prior to the second image frame by an interval corresponding to the predetermined period;

comparing the reference parameter of one pixel in the first image frame with the reference parameter of the same pixel in the second image frame to generate a corresponding difference value;

comparing each difference value with a first threshold value and a second threshold value, the first threshold value being greater than the second threshold value, generating a plurality of first contours according to the pixels which are adjacent to each other and each having the difference value greater than the first threshold value, and generating a plurality of second contours according to the pixels which are adjacent to each other and each having the difference value greater than the second threshold value;

selecting second contours that overlap the first contours for establishing a corresponding first moving area, the first moving area comprising every pixel associated with the selected second contours;

determining whether the pixels outside the first moving area in the second image frame are registered as background pixels, wherein when all the pixels associated with the moving object inside the first moving area are registered as background pixels, a status parameter is assigned to the moving object, and a movement of the moving object between the first and second image frames accordingly changes the status parameter, and when movement of the moving object between the first and second image frames is detected, the status parameter is reset to 20 be zero, and when movement of the moving object between the first and second image frames is not detected, the status parameter is increased by 1; and comparing the reference parameter of the background pixel in the second image frame with a corresponding background value of the background pixel to determine whether the background pixel is related to the moving object.

9. The moving object segmentation method of claim 8 wherein when the status parameter is greater than a status confirmation value, the reference parameter of each pixel associated with the moving object is used to update the corresponding background value.

* * * * *